US006361253B1

(12) United States Patent
Klobucar et al.

(10) Patent No.: US 6,361,253 B1
(45) Date of Patent: Mar. 26, 2002

(54) METHOD OF FORMING A FIRE BREAK IN A DUCT

(75) Inventors: Joseph M. Klobucar, Detroit; Michael R. Lutz, Ann Arbor, both of MI (US)

(73) Assignee: Durr Environmental, Inc., Plymouth, MI (US)

( * ) Notice: Subject to any disclaimer, the term of this patent is extended or adjusted under 35 U.S.C. 154(b) by 0 days.

(21) Appl. No.: 09/678,978

(22) Filed: Oct. 5, 2000

Related U.S. Application Data

(62) Division of application No. 09/272,476, filed on Mar. 19, 1999, now Pat. No. 6,293,735.

(51) Int. Cl.[7] ................................................ B65G 53/16
(52) U.S. Cl. ......................................................... 406/86
(58) Field of Search ......................... 406/86; 15/104.03, 15/104.05, 104.061, 104.067, 104.069

(56) References Cited

U.S. PATENT DOCUMENTS

| | | | | |
|---|---|---|---|---|
| 3,648,754 | A | * | 3/1972 | Sephton |
| 4,174,750 | A | * | 11/1979 | Nichols |
| 4,583,585 | A | * | 4/1986 | Eistenne et al. |
| 4,657,597 | A | | 4/1987 | Wolf et al. |
| 4,666,530 | A | | 5/1987 | Houser |
| 5,364,473 | A | * | 11/1994 | Van Der Does |
| 5,570,742 | A | | 11/1996 | Reynolds et al. |
| 5,625,917 | A | | 5/1997 | Hawkins |
| 5,711,046 | A | | 1/1998 | Potter |
| 5,868,858 | A | | 2/1999 | Creed |
| 5,967,699 | A | | 10/1999 | Knapp |

* cited by examiner

*Primary Examiner*—Christopher P. Ellis
*Assistant Examiner*—Kenneth W Bower
(74) *Attorney, Agent, or Firm*—Howard & Howard

(57) ABSTRACT

A duct cleaning apparatus for cleaning an inside surface of a duct including an elongated flexible element extending inside the duct having a first end supported in the duct spaced from an inside surface, a second opposed free end and having a length sufficient to engage the inside surface of the duct, preferably greater than the diameter of the duct. Fluid flow through the duct, particularly turbulent flow, causes the elongated flexible element to oscillate or flap, striking the inside surface and removing foreign material from a predetermined portion of the inside surface of the duct. The apparatus of this invention may be used to create a fire break, for example, by removing flammable particles or dust from an area of the duct, preventing a flame from propagating along the duct through the flammable material.

8 Claims, 1 Drawing Sheet

METHOD OF FORMING A FIRE BREAK IN A DUCT

This application is a divisional application of Ser. No. 09/272,476, filed Mar. 19, 1999, now U.S. Pat. No. 6,293,735.

FIELD AND BACKGROUND OF THE INVENTION

This invention relates to a simple apparatus for removing foreign material from an inside surface of a duct, such as a cylindrical duct carrying wood dust laden air or other fluids having foreign material entrained therein. Such dust or foreign material builds up on the inside surface of the duct increasing fluid flow resistance and potentially creating a fire hazard where the accumulation is flammable.

In a typical application of the apparatus of this invention, ducts transmitting fluid flow must be periodically cleaned, which is a labor intensive time consuming procedure. For example, in the wood and pulp industry, a duct is located above or adjacent the work area which removes wood dust laden air. Similarly, ducts commonly remove kiln or coal dust, paint and dust particles, etc. Such particles must be removed from the inside surface or surfaces of the duct to maintain the efficiency of the system.

Where the particulate material carried by the duct is flammable, such as wood or coal dust or paint particles, it is desirable to create a break in the fouling layer to prevent flame from propagating along the duct through the fouling layer. That is, it is very desirable in such applications to remove flammable particles from areas on the inside surface of the duct to create a dust free area or fire break which prevents propagation of flame through the duct. Further, a flow, pressure or temperature sensor may be rendered inoperative or inaccurate by fouling which must be removed from the duct wall.

The duct cleaning apparatus of this invention effectively removes foreign material from an inside surface of the duct where the apparatus is located and creates dust free areas preventing propagation of flame through the duct. Further, the duct cleaning apparatus may be utilized to continuously clean the area where sensors located within the duct.

SUMMARY OF THE INVENTION

The apparatus for cleaning a duct of this invention comprises an elongated flexible element extending inside the duct having a first end supported in the duct spaced from the inside surface and a second opposed free end. The elongated flexible element has a length sufficient to engage the inside surface of the duct and preferably has a length equal to or greater than the diameter of the duct. Most preferably, the length of the elongated flexible element is at least twice the diameter of the duct. The elongated flexible element removes foreign material on the inside surface and cleans the inside surface of the duct as fluid flow is maintained through the duct. The duct cleaning apparatus of this invention will be more efficient where the fluid through the duct is turbulent, i.e., where the Reynolds number is greater than 2,000. Turbulent flow will cause the elongated flexible element to continuously engage or impact the inside surface of the duct, thereby removing foreign material.

Where the duct is metallic, the elongated flexible element is preferably nonmetallic to avoid sparking. However, the elongated flexible element may take various forms including a rope-like element. In the preferred embodiment, the elongated element is a strap preferably formed of a woven fabric, such as nylon webbing. As stated above, the length of the elongated flexible element will depend upon several factors including the diameter or maximum width of the duct, the velocity and viscosity of the fluid and the foreign material entrained in the fluid. An elongated flexible element having a width of 2" to 5" and a thickness of about 0.3" to 0.1" is suitable. In a vertical duct having a 32" diameter, a strap of nylon webbing having a length of 6' or greater is particularly suitable.

The first end of the elongated flexible element may be affixed inside the duct by any suitable means, including a bracket or support rod which extends, for example, through the duct. The rod may be secured to the duct by any suitable means within the duct. Alternatively, conventional brackets affixed to the duct wall may be utilized. Where a single elongated flexible element is utilized, the first end of the flexible element is preferably supported within the duct generally in the center or longitudinal axis of the duct. A plurality or gang of elongated flexible elements may also be utilized, particularly where the diameter of the duct exceeds 4' or the duct is rectangular or polygonal. Although the duct cleaning apparatus of this invention is particularly suitable for cleaning an internal surface of a cylindrical duct, the duct cleaning apparatus of this invention may also be utilized for cleaning an internal surface of a rectangular or polygonal duct, wherein an elongated flexible element may be located adjacent to but spaced from each surface of the duct.

The duct cleaning apparatus of this invention thus provides continuous cleaning action as long as fluid flow is maintained through the duct. No external power source is required and the apparatus requires no electronic or mechanical controls. The duct cleaning apparatus of this invention is inexpensive to manufacture and install and is capable of operating in any duct orientation. The duct cleaning apparatus of this invention results in only a very minimal increase in fluid flow resistance, requires no labor and minimal maintenance. Other advantages and meritorious features of the duct cleaning apparatus of this invention will be more fully understood from the following description of the preferred embodiments, the claims and the appended drawings, a brief description of which follows.

BRIEF DESCRIPTION OF THE DRAWINGS

FIG. 4 is a side partially cross-sectioned view illustrating a plurality of duct cleaning apparatuses in operation.

DETAILED DESCRIPTION OF THE PREFERRED EMBODIMENTS

Figure 1:
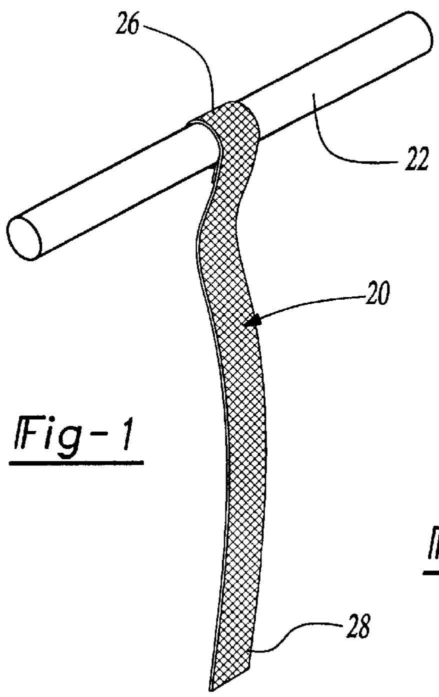
FIG. 1 is a side perspective view of one embodiment of the duct cleaning apparatus of this invention.
Figure 2:
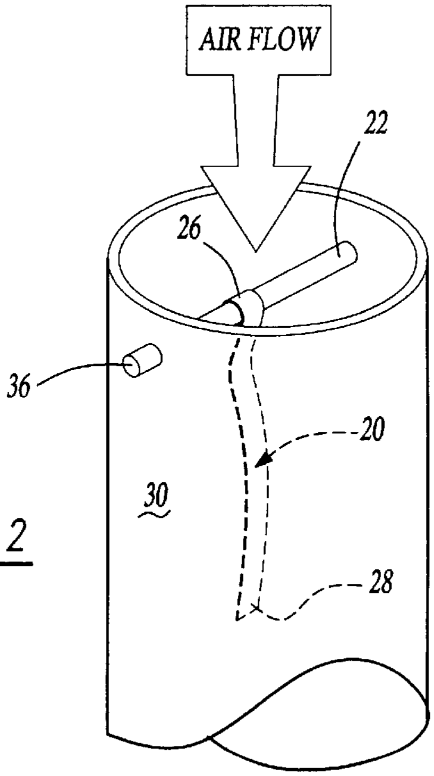
FIG. 2 is a side perspective view of the duct cleaning apparatus shown in FIG. 1 installed in a cylindrical duct.
Figure 3:
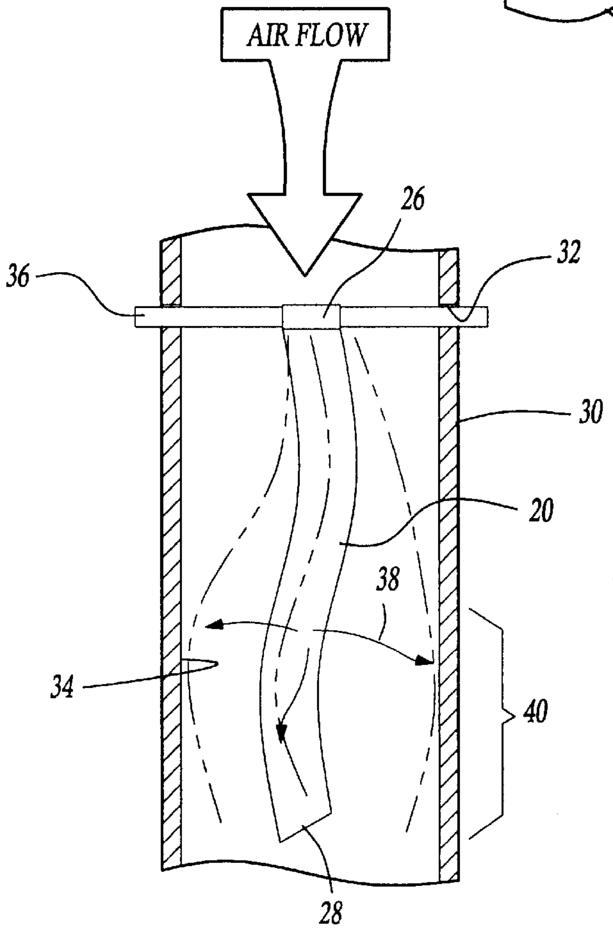
FIG. 3 is a side partially cross-sectioned view of FIG. 2 illustrating the operation of the duct cleaning apparatus of this invention.

The duct cleaning apparatus shown in FIG. 1 includes an elongated flexible element 20 in the form of a strap supported on a support member or rod 22. In the disclosed embodiment of the duct cleaning apparatus of this invention, one end 26 of the strap is wrapped around the support rod 22 and secured to the rod by any suitable means, including sewing, adhesive, staples or riveting. The opposed end 28 of the flexible element is free to move with the fluid flow as shown in FIG. 2. The support rod 22 is received through opposed openings 32 in the duct 30, such that the ends 36 of the rod extend through the duct openings as shown in FIG. 3. The end 36 of the rod generally do not require securement in the openings 32, but may be secured by conventional means including cotter pins or mechanical fasteners. FIG. 3 illustrates the operation of the cleaning apparatus of this invention to remove foreign material from an inside surface 34 of the duct 30. As set forth above, it is particularly desirable to remove foreign flammable material from an inside surface of a duct to create a fire break in the fouling layer or deposit of foreign material to prevent flame from propagating along the duct through the fouling layer. The air flow through the duct 30, particularly turbulent air flow, causes the elongated flexible member to oscillate or flap as shown by arrows 38, striking the inside surface 34 of the duct and removing foreign material from the inside surface in the area 40. This creates fire break in the accumulated foreign material preventing propagation of flame through the duct as described above. Further, the cleaning apparatus of this invention may be utilized to clean a flow, pressure or temperature sensor located in the area 40 which would otherwise render the sensor inoperative.

The duct cleaning apparatus of this invention was tested in a duct carrying wood dust laden air. The wood dust accumulates on the inside surface of the duct up to several inches in thickness. The duct was a vertical cylindrical duct 32" in diameter. The elongated flexible member was a woven nylon webbing strap 3" wide and approximately 1/16" thick having a length of 6' or slightly greater than twice the diameter of the duct. During operation, the airflow velocity through the duct was approximately 3,500 ft. per minute in the downward direction. After twenty-four hours of operation, the test section was inspected. The inside surface of the duct was coated with a layer dust up to approximately ½" in thickness. There was a section, however, approximately aligned with the free end of the elongated flexible member that was completely free of visible or measurable wood dust deposit. Thus, the duct cleaning apparatus of this invention formed an effective fire break in the wood dust on the inside surface of the duct which would have prevented flame from propagating along the duct through the flammable wood dust layer. The duct cleaning apparatus of this invention thus creates and maintains a fire break in the fouling layer, which is a principal object of this invention.

As will now be understood, the length, weight, configuration, material and location of the flexible member is such that the fluid flow induced motion causes the elongated flexible member to strike the inside duct surface to be cleaned. This striking of the inside surface of the duct by the elongated flexible member causes abrasion and removal of any accumulated foreign material. The length of the elongated flexible element will thus depend upon the diameter or maximum width of the duct, the viscosity of the fluid and velocity of the fluid flow. As set forth above, however, the length of the elongated flexible member is preferably approximately equal to or greater than the diameter or maximum width of the duct or more preferably at least twice the diameter. It has also been found that a strap having a length substantially greater than its width is preferred to a cylindrical or rope-like flexible element because a flexible strap provides improved cleaning of the inside surface of the duct. A woven strap, particularly a woven nylon webbing strap provides improved strength.

As will be understood by those skilled in the art, various modifications may be made to the duct cleaning apparatus of this invention within the purview of the appended claims. The duct cleaning apparatus of this invention may be utilized to clean an internal surface of a duct regardless of the orientation of the duct, although a vertical orientation is preferred. Further, the duct cleaning apparatus of this invention may be utilized to clean a rectangular or polygonal duct wherein a plurality of elongated flexible elements supported in the duct opposite to but spaced from each of the walls may be preferred. Finally, the duct cleaning apparatus of this invention may also be utilized to clean an internal surface of a duct carrying liquid, although the duct cleaning apparatus of this invention is particularly suitable for cylindrical ducts transmitting a gas having entrained foreign materials, such as flammable particles or dust to create fire break as described above. Having described the invention, the invention is now claimed, as follows.

What is claimed is:

1. A method of forming a fire break in a duct conveying a gas and entrained flammable particulate material which accumulates on an inside surface of said duct, said method comprising:

suspending a flexible elongated nonmetallic element in said duct, conveying gas having flammable particulate material entrained therein through said duct in turbulent flow, causing said flexible nonmetallic element to continuously oscillate and flap within said duct striking said inside surface of said duct wherein said oscillating and flapping of said flexible nonmetallic element does not generate a spark between said element and said duct, removing accumulation of flammable particulate material from said inside surface of said duct in the area of said flexible elongated nonmetallic element, and creating a fire break in the accumulation of flammable particulate material preventing propagation of a flame through said duct.

2. The method of forming a fire break in a duct as defined in claim 1, said method including suspending said flexible nonmetallic element generally in the longitudinal axis of said duct spaced from said inside surfaces and said turbulent gas flow causing said flexible elongated nonmetallic element to continuously oscillate and flap striking all of said inside surfaces of said duct, creating said fire break surrounding said flexible elongated element.

3. The method of forming a fire break in a duct as defined in claim 1, wherein said method includes suspending a woven fabric flexible elongated nonmetallic element in said duct spaced from said inside surface having a length at least equal to twice the width of said duct.

4. The method of forming a fire break in a duct as defined in claim 1, wherein said method includes suspending adjacent one end a woven fabric flexible elongated nonmetallic strap having a width greater than its thickness in said duct on a support member spaced from said inside surface of said duct.

5. The method of forming a fire break in a duct as defined in claim 4, wherein said method includes suspending a woven fabric flexible elongated nonmetallic strap in said duct having a length equal to at least twice the vidth of said duct adjacent said one end.

6. The method of forming a fire break in a duct as defined in claim 1, wherein said method includes suspending a plurality of flexible elongated nonmetallic elements in said duct spaced along the longitudinal axis of said duct creating a plurality of longitudinally spaced fire breaks in said duct in said accumulation of flammable particulate material preventing propagation of a flame through said duct.

7. The method of forming a fire break in a duct as defined in claim 1, wherein said method includes suspending a flexible elongated nonmetallic strap in said duct adjacent one end from a rod extending through said duct having a length at least equal to twice the width of same duct.

8. A method of forming fire breaks in a duct conveying a gas with entrained flammable particulate material which accumulates on an inside surface of said duct, said method comprising:

suspending a plurality of flexible elongated nonmetallic elements in said duct spaced along a longitudinal axis of said duct, conveying gas having flammable particulate material entrained therein through said duct in turbulent flow, causing said flexible nonmetallic elements to continuously oscillate and flap within said duct striking said inside surface of said duct wherein said oscillating and flapping of said flexible nonmetallic elements do not generate a spark between said elements and said duct, removing accumulation of flammable particulate material from said inside surface of said duct, and creating a plurality of spaced fire breaks in the accumulated flammable particulate material for preventing propagation of a flame through said duct by said flammable particulate material.

* * * * *